(12) United States Patent
Terao et al.

(10) Patent No.: US 7,381,021 B1
(45) Date of Patent: Jun. 3, 2008

(54) METHOD FOR LOADING TUBE BUNDLES ON RAILCARS

(75) Inventors: Goro Terao, Rancho Palos Verdes, CA (US); Efren Ramirez, Whittier, CA (US); Stanley Curtis Whittemore, La Habra, CA (US)

(73) Assignee: Western Tube & Conduit Corporation, Long Beach, CA (US)

( * ) Notice: Subject to any disclaimer, the term of this patent is extended or adjusted under 35 U.S.C. 154(b) by 444 days.

(21) Appl. No.: 11/231,683

(22) Filed: Sep. 20, 2005

(51) Int. Cl.
*B60P 7/08* (2006.01)
(52) U.S. Cl. .......................... 410/98; 410/36; 410/40; 410/42; 410/87; 410/122
(58) Field of Classification Search .............. 410/32, 410/34, 36, 37, 39, 40, 42, 47, 87, 88, 98, 410/122, 155; 105/355
See application file for complete search history.

(56) References Cited

U.S. PATENT DOCUMENTS 6,722,828 B2 * 4/2004 French .................. 410/37

* cited by examiner

*Primary Examiner*—Stephen Gordon
(74) *Attorney, Agent, or Firm*—Foley & Lardner LLP

(57) ABSTRACT

A method for loading tube bundles on a railcar includes placing the tube bundles lengthwise on the car and stacked above the car to form packs. These packs are spaced longitudinally one from another on the car. Spacing blocks are configured to go within the longitudinally extending spaces. These spacing blocks include parallel plates which are rigidly displaced one from another by blocks. Padding is arranged on the outer side of the plates. One set of blocks extending between the parallel plates is arranged in juxtaposition with the bed of the railcar to receive strapping for retention.

8 Claims, 1 Drawing Sheet

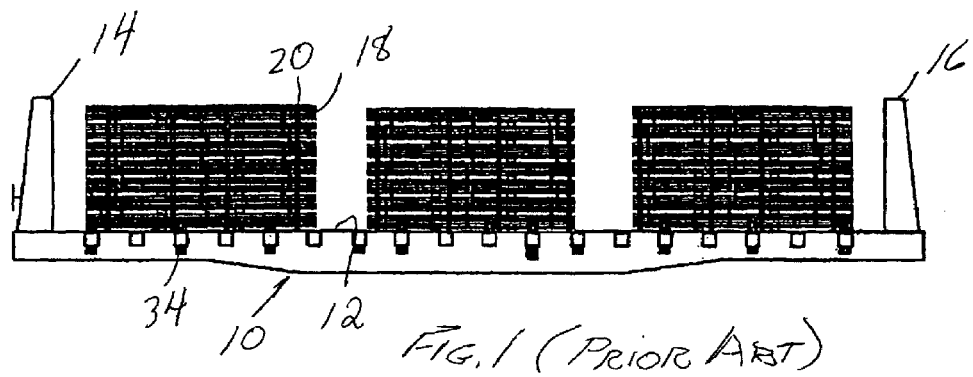
FIG. 1 (PRIOR ART)
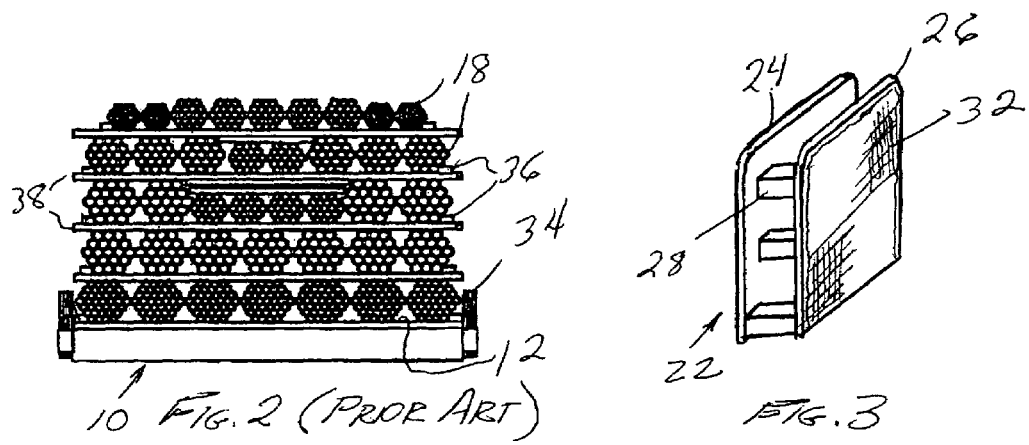
FIG. 2 (PRIOR ART)
FIG. 3
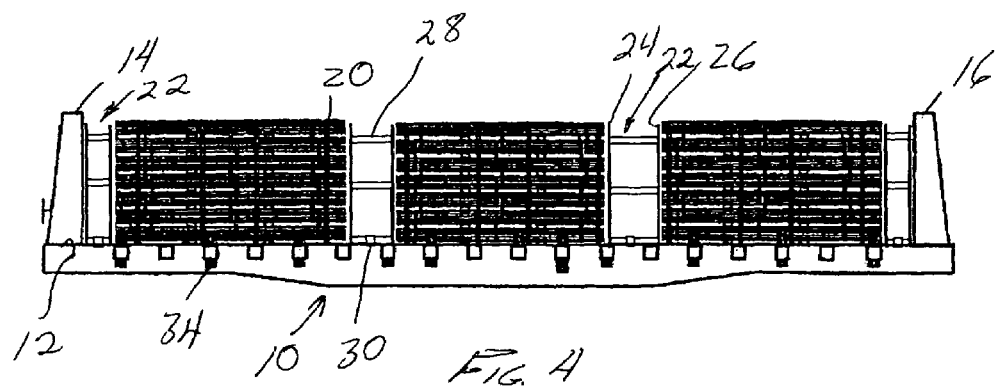
FIG. 4

METHOD FOR LOADING TUBE BUNDLES ON RAILCARS

BACKGROUND OF THE INVENTION

The field of the present invention is systems for loading railcars.

The rail industry has developed a great deal of experience in the handling of materials on railcars. Particular requirements have been established for stacking materials on flat cars including dunnage, blocking and specific strapping requirements.

With bundled and elongate products such as tubing, wood beams are laid laterally across the car as dunnage to support the bundles. The tubes are in bundles and extend longitudinally of the railcar. Short stakes, blocking and strapping then retain the load in place. FIG. 2 illustrates one such recommended stacking.

In spite of these carefully defined methods for retaining tube bundles, the natural vibration of the car can result in individual tubes slowly working longitudinally outwardly from the bundle. If left unattended, the individual tubes can extend into harms way or come into contact with adjacent tube bundles or bulkheads. This can make the bundles difficult to unload and cause damage to the tubing. Naturally, bulkheads can be placed against the ends of the tubing or the tubing against barriers. However, such tight assemblies create their own problems in terms of loading, unloading and damage from motion of the tubes relative to other tubes, the bulkheads and barriers.

SUMMARY OF THE INVENTION

The present invention is directed to a method for loading tube bundles on a railcar. The tube bundles are placed lengthwise on the bed of the railcar and stacked conventionally above the bed to form packs of multiple tube bundles. Spaces are left between adjacent packs of tube bundles. Spacing blocks including parallel plates rigidly displaced from one another are configured to be thinner than the corresponding space extending longitudinally between adjacent packs. The spacing blocks are positioned on the bed between longitudinally adjacent packs and fixed to the bed of the railcar.

Accordingly, it is an object of the present invention to provide an improved method for loading tube bundles on a railcar. Other and further objects and advantages will appear hereinafter.

BRIEF DESCRIPTION OF THE DRAWINGS

FIG. 1 is a side view of a railcar with tube bundles stacked thereon as in the prior art.

FIG. 2 is an end view of the stacked tube bundles of FIG. 1.

FIG. 3 is a perspective view of a spacing block.

FIG. 4 is a side view of a railcar with tube bundles and spacing blocks.

DETAILED DESCRIPTION OF THE PREFERRED EMBODIMENT

Turning in detail to the Figures, a railcar, generally designated 10, includes a bed 12 and bulkheads 14, 16. The bulkheads 14, 16 are shown to be at either end of the bed 12. The railcar also includes standard railroad trucks, couplings and equipment (not shown).

Tube bundles 18 are shown placed on the bed 12 in accordance with standard practice. One such example of approved tube bundle stacking is illustrated in FIG. 2 which shows the packing of various sizes of tube bundles 18. Typically the tube bundles 18 are placed on the bed 12 by forklifts. The packs of tube bundles 18 thus formed, are also arranged with spaces extending longitudinally therebetween. Conveniently, the packs of tube bundles 18 are also spaced from the bulkheads 14, 16. With this spacing, the bundles 18 are easily and quickly placed. Strapping 20 is able to tie each of the piles of tube bundles 18 to the bed 12 of the railcar 10.

Spacing blocks, generally designated 22, may then be configured to fit within the spaces longitudinally of the railcar 10 between longitudinally adjacent packs of tube bundles 18 and between the bulkheads 14, 16 and the most adjacent packs of tube bundles 18. The blocks 22 are specifically made or adjusted to be thinner than the corresponding space into which the block 22 is placed specifically to facilitate placement of the spacing block 22 on the bed 12 between bundles 18 or bundles 18 and bulkheads 14, 16. These spacing blocks 22 prevent loose tubes in the tube bundles 18 from working out and interfering with adjacent structure or elements and making it difficult to offload tube bundles.

The spacing blocks 22 each include parallel plates 24, 26. The parallel plates 24, 26 are typically made up of two 4"×8"×¾" plywood panels which are held together in abutting edge relationship by 2"×4" ties nailed to the plywood.

Wood blocks 28 space the parallel plates 24, 26. The wood blocks 28 are typically 4"×4" lumber. Inexpensive jacks may also be employed to define the fixed displacement of the plates 24, 26 instead of the wood blocks 28. The blocks 28 are nailed in place to extend between the parallel plates 24, 26 to rigidly displace the two parallel plates 24, 26 one from another. One set of the wood blocks 28 is positioned along one peripheral edge of the parallel plates 24, 26. The peripheral edge with the wood blocks 28 is placed in juxtaposition with the bed 12 of the railcar 10.

Strapping 30 extends over the set of wood blocks 28 which lies along the peripheral edge of the plates 24, 26 and set in juxtaposition with the bed 12 of the railcar 10. This placement of the spacing blocks 22 can be easily accomplished because the blocks 22 are fabricated to fit into the spaces between adjacent packs of tube bundles 18 and between tube bundles 18 and a bulkhead 14, 16 with clearance. Two to two and one-half inches clearance on either side of the spacing blocks 22 is believed adequate.

To insure that the ends of the tubes coming into contact with the spacing blocks 22 will not be injured by vibration against the parallel plates 24, 26, burlap cushions 32 are placed on the outer surfaces of the parallel plates 24, 26. These cushions may be applied by conventional means including gluing or stapling.

The overall process of loading tube bundles 18 includes placing the tube bundles on a flat car 10. Stakes 34 on the edges of the flat car 10 and blocks 36 against the bundles 18 insure the bundles 18 do not roll from the car 10. Wood beams 38 are placed between bundles as dunnage. Strapping 20 then ties the load down. The spacing longitudinally of the railcar 10 between packs of tube bundles 18 and between the packs of tube bundles 18 and the bulkhead 14, 16 is then measured and spacing blocks 22 are configured based upon the spacing measurements. Once fabricated, the spacing blocks 22 are positioned on the bed 12 of the railcar 10 in the longitudinal spaces. The spacing blocks are then fixed to the bed between adjacent packs with strapping 30. The entire load may then be covered.

Accordingly, an improved system for facilely loading tube bundles on a railcar has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for loading tube bundles on a railcar having a bed, comprising placing the tube bundles lengthwise on the bed and stacked above the bed to form packs of multiple tube bundles, there being a space extending longitudinally between adjacent ones of said packs;

configuring a spacing block including parallel plates rigidly displaced one from another, the block with the parallel plates being configured thinner than the corresponding space extending longitudinally between adjacent ones of said packs to facilitate placement of the spacing block on the bed between longitudinally adjacent ones of said packs;

positioning the spacing block on the bed between longitudinally adjacent ones of said packs;

fixing the spacing block to the bed between adjacent ones of said packs.

2. The method of claim 1, said step of fixing the spacing block to the bed including strapping the spacing block between the parallel plates to the bed.

3. The method of claim 1, said step of configuring the spacing block including fabricating the parallel plates with wood blocks extending therebetween, the parallel plates being plywood.

4. The method of claim 1, said step of configuring the spacing block including fabricating the parallel plates with spacers extending therebetween, some of the spacers being on one peripheral edge of each of the parallel plates.

5. The method of claim 4, said step of fixing the spacing block being with the peripheral edges of the parallel plates with the spacers thereon being in juxtaposition with the bed.

6. The method of claim 5, including strapping the spacing block between the parallel plates to the bed includes extending the strapping over the spacers in juxtaposition with the bed.

7. The method of claim 1, said step of configuring the spacing block including fabricating the parallel plates with padding on outer sides of the parallel plates.

8. The method of claim 1, the steps occurring in seriatim.

* * * * *

UNITED STATES PATENT AND TRADEMARK OFFICE
Certificate

Patent No. 7,381,021 B1

Patented: June 3, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Efren Ramirez, Whittier, CA (US); and Stanley Curtis Whittemore, La Habra, CA (US).

Signed and Sealed this Fifteenth Day of March 2011.

D. GLENN DAYOAN
*Supervisory Patent Examiner*
Art Unit 3612
Technology Center 3600